Aug. 14, 1956
H. W. LIEBMANN
2,758,570
DEVICE FOR EFFECTING A DWELL AT THE END
POSITIONS OF RECIPROCATING ELEMENTS
Filed Aug. 19, 1954
3 Sheets-Sheet 2
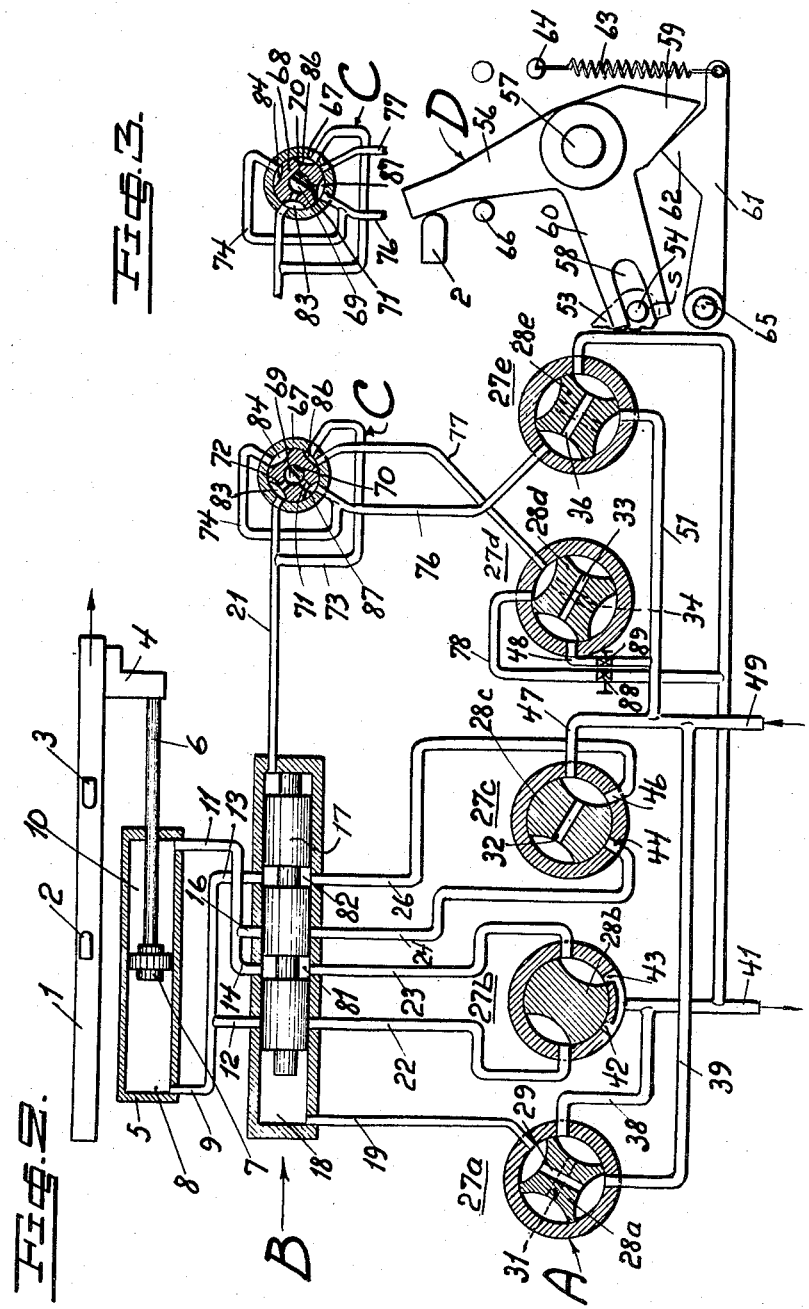
Inventor
Hans Werner Liebmann
by Pierce, Scheffler & Parker
attys Aug. 14, 1956
H. W. LIEBMANN
2,758,570
DEVICE FOR EFFECTING A DWELL AT THE END
POSITIONS OF RECIPROCATING ELEMENTS
Filed Aug. 19, 1954
3 Sheets-Sheet 3
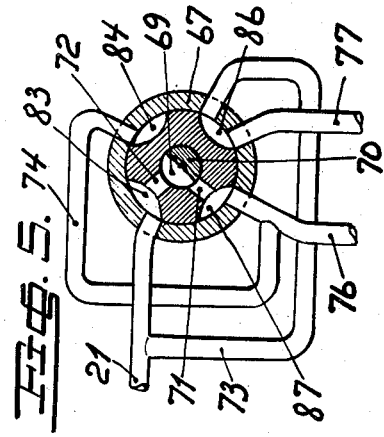
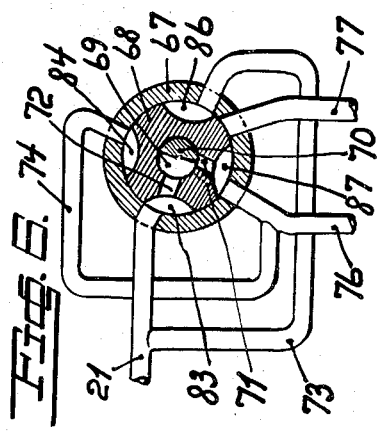
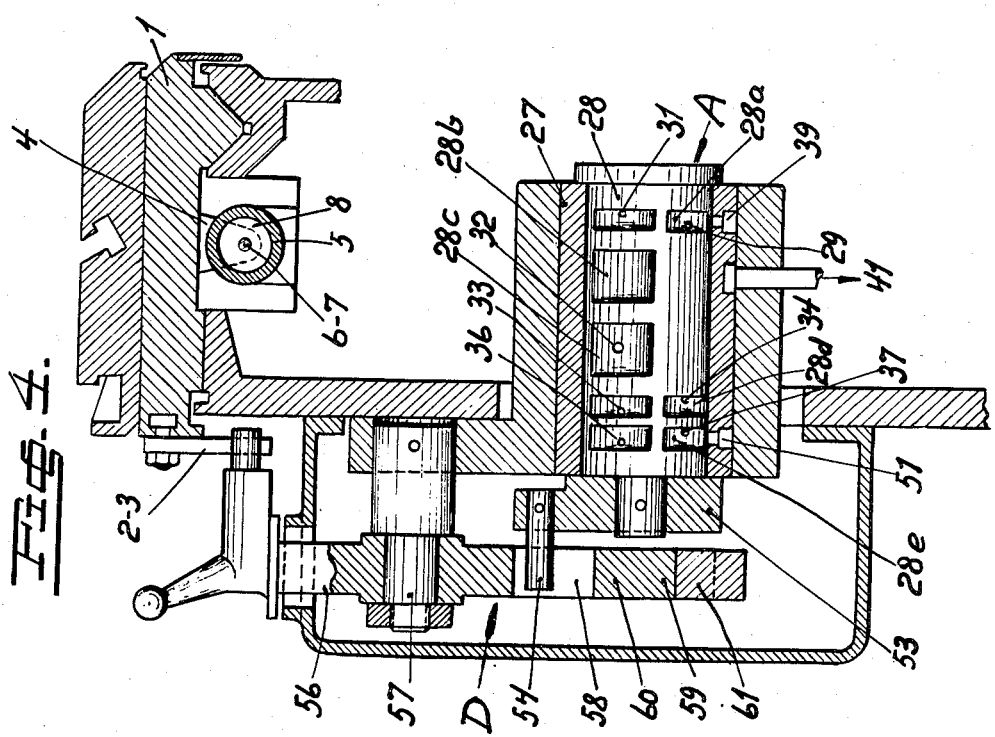
Hans Werner Liebmann
INVENTOR
By Pierce, Scheffler & Parker
ATTORNEYS – # United States Patent Office 2,758,570
Patented Aug. 14, 1956

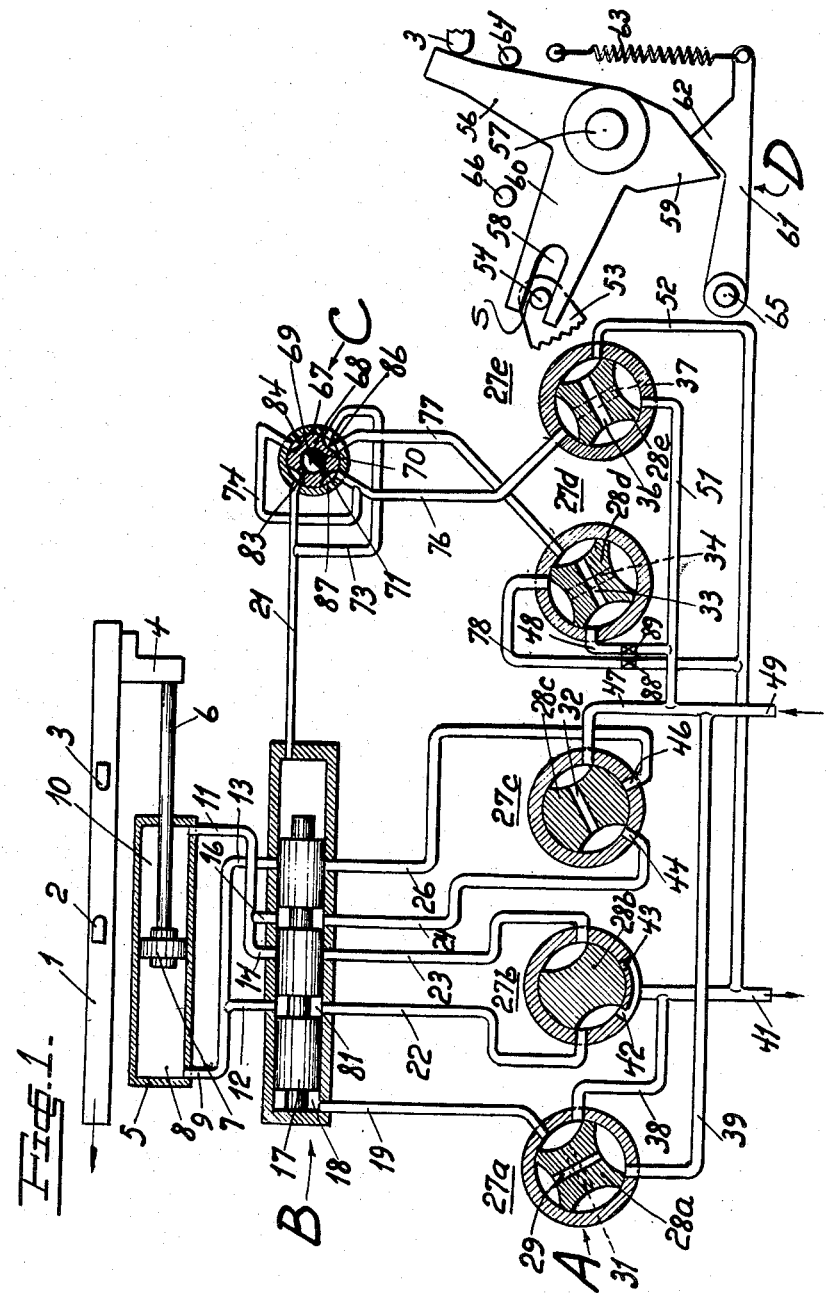

2,758,570

DEVICE FOR EFFECTING A DWELL AT THE END POSITIONS OF RECIPROCATING ELEMENTS

Hans Werner Liebmann, Karlskoga, Sweden, assignor to Aktiebolaget Johanssons Press- & Hejarverktyg, Bofors, Sweden, a company of Sweden Application August 19, 1954, Serial No. 451,013

Claims priority, application Sweden August 19, 1953

5 Claims. (Cl. 121—45)

This invention relates to hydraulically actuated reciprocating machine elements and more particularly to a device by which the element such as a table may be caused to make a stop at one of the end positions or at both of them, the length of its dwelling in said position being controlled in a simple manner as one desires. More particularly this invention relates to tables of grinding machines, for instance cylindrical grinding machines the table of which in frequent cases being intended to make a stop at one of its end positions.

Previously known constructions for bringing about a dwell in the motion of a reciprocating table when reaching its opposite end positions were all subject to certain disadvantages. Accordingly some constructions worked without sufficient precision with the result that the end positions, i. e. the points where reversal of the table motion occurs was not constant, but rather changed as the rate of movement of the table or its dwelling varied. The known constructions working with sufficient exactness were too complicated and had too many moving parts. Particularly this happened on demanding, besides a great accuracy, that an adjustable stop be achieved, at pleasure, either in one of the end positions of the table or in both of them.

On one type of device for this purpose previously known the stopping at the end positions was effected by means of a turn-over valve, governing the working medium, the valve being stopped by a special locking device in its middle position for a period of time, corresponding to the desired dwelling and then being turned over completely. However, said locking device involved an undesirable number of construction parts.

The device according to the present invention requires a minimum of construction parts and operates with an extremely high degree of exactness. The table will, at every time, stop at an exactly defined end position, independent of the moving rate of the table and of its dwelling. By a simple turning-over adjustment which can be made at any time, the table may be caused to make a stop in one of the end positions or in both of them, or it may be reciprocated without any stops in the end positions. The dwelling time also at pleasure may be varied continuously from practically zero and upward.

This invention relates to a device for controlling the standstill or dwell at the end positions of hydraulically actuated reciprocating elements, including a hydraulically actuated engine, pressure and return ducts for pressure fluid to the engine, turn-over valves for reversing the pressure and return ducts of the engine, a hydraulically actuated delay valve mounted in said pressure and return ducts stopping the reciprocating element at its end positions, operation ducts for deliverying pressure fluid to the delay valve, two way valves arranged in each one of said operation ducts for reversing the pressure duct and return duct of the delay valve, and an adjustable throttling valve arranged in one of the operation ducts controlling the movements of the delay valve. The device is characterized by a pass-by duct shunted to the throttling valve and one of the two-way valves, and a check valve provided in the pass-by duct, the two-way valves and the check valve being arranged for synchronous operation and being reversible by the reciprocating element.

Hereinafter the invention will be more exactly described with reference to the embodiment, illustrated in the attached drawings.

Figs. 1 and 2 show diagrammatically an illustration of the device in different stages of the working cycle, Fig. 3 shows the other position of the valve (C), Fig. 4 is a vertical section through a portion of the machine showing the reciprocating table, the control valve A and the interconnection therebetween, and Figs. 5 and 6 are diagrammatic views, at a larger scale, showing respectively the valve C in each of its two positions.

Referring now particularly to Fig. 1, the reciprocating machine part 1 in the illustrated position is moving in the left hand direction of the figure. That reciprocating machine part, for instance the table of a cylindrical grinding machine, is actuated by a double acting piston 7 over piston rod 6 and connecting piece 4. Piston 7 moves in a cylinder 5 closed at its both ends. Accordingly on each side of piston 7 is formed pressure chambers 8 and 10 respectively. Pressure fluid enters at 49 and passes ducts 47, 32, 44, 24, 16 and 11, then entering pressure chamber 10 at the right hand side of piston 7. Return fluid from pressure chamber 8 is vented through ducts 9, 12, 22, 42 and 41.

As table 1 approaches its left hand end position a knob 3, see Fig. 4, acts on arm 56 of a snap reverser D, which then will be brought to its middle position, the lips 59 and 62 being opposite one to another. By means of arm 60 with a notch 58, a pin 54 and an arm 53 the reversing device acts upon a reversing valve A all sections of which then being turned towards their middle positions. Because of the small clearance S between pin 54 and the inside faces of notch 58 the operation of which will be more exactly described hereinafter snap reverser D and reversing valve A do not reach their middle positions simultaneously, but in the moment as lips 50 and 62 are opposite one to another the openings 42 and 44 still are slightly opened. Consequently, the table will be moved still more to the left until the lip 59 will be put past lip 62, the spring device 61, 63 then rapidly reversing the snap reverser, so that arm 56 now will engage the immovable shoulder 66. Simultaneously the reversing valve will be turned over to the position according to Fig. 2.

During the first part of their movement, i. e. during their turning from the position of Fig. 1 to the middle position, valve plugs 28b and 28c successively will close openings 42 and 44. During that time the table 1 will move at a successively still slower rate. The lips 59 and 62 opposing one another, the openings 42 and 44 as above mentioned only are slightly opened and accordingly the rate of movement of the table will be very slow. The sections 27b and 27c of the reversing valve A then immediately turning over to the position of Fig. 2 the table will stop, but the movement rate then will be so slow that the table comes to a stop practically without any shock. Thus the table always will change very smoothly from full speed to standstill. In this connection it is interesting to observe that the moving rate of the table immediately before the point of reversal always will be equal. That depends upon the fact that the openings 42 and 44 in the moment as the lips 59 and 62 are opposing one another always are equally open. Sections 27a, 27d and 27e of valve A serve as pilot valves for the main valve B. Valve sections 27b and 27c control, together with piston 17, the flow of pressure fluid to the fluid motor 5.

The sections 27b and 27c of the reversing valve having turned over to the position of Fig. 2 all ducts to the cylinder 5 are closed, namely ducts 12 and 16 by the valve plugs 28b and 28c and ducts 13 and 14 by piston valve 17. Thus piston 7 cannot move in any direction, but remains locked in its left hand turning position. However the reversing valve sections 27a, 27d and 27e simultaneously have turned over to the position of Fig. 2, and consequently pressure fluid through ducts 49, 39, 29 and 19 will begin to enter cylinder portion 18 of the retarding valve B. Then piston 17 begins to move to the right from the position shown in Fig. 1, and the pressure fluid in cylinder 18 at the right hand of piston 17 will be vented through duct 21, channels 71 and 72 of the throttling valve C, elements 69—72, and the channels 76, 36, 52 and 41. If the pressure fluid forced out by piston 17 is throttled in throttling valve C, piston 17 can only move at a limited rate of movement. Accordingly it will take some time before it has reached its right hand limit position on Fig. 2. During the movement of piston 17, piston 7 will be locked at its left hand end position. A desired dwelling time thus very simply may be adjusted by controlling the throttling at valve C. Valve C in addition to its throttling action also serves as a control valve for ducts 21, 76 and 77.

When piston 17 reaches its right hand position on Fig. 2 it will uncover other inlet and venting ducts for the pressure fluid to cylinder 5. Pressure fluid now enters pressure chamber 8 through the ducts 49, 47, 46, 26, 13 and 9. Returning fluid is vented from the pressure chamber 10 through ducts 11, 14, 23, 43 and 41. The table thus will move in the right hand direction of the figure.

The table approaching its right hand turning position the knob 2 will act upon arm 56 moving it towards its middle position. In similar manner as has been described the lip 59 will pass the lip 62, reversing valve A will be turned over rapidly to the piston shown in Fig. 1, and the table will stop at its right hand turning position. Now pressure fluid through ducts 49, 48, 33, 77, 86, 73 and 21 will begin to enter cylinder 18 at the right hand side of piston 17, thus by-passing the throttling valve C. Hence piston 17 will be moved over to its left hand position, then forcing out the pressure fluid to the left in the cylinder 18 through ducts 19, 38 and 41. Accordingly piston 7 will not make a stop at its right hand turning position, but it will begin moving to the left practically immediately after its stopping in the turning position.

Thereafter the working cycle will be repeated in the manner described before.

In the arrangement of Fig. 1 and 2 the table 1 accordingly will make a more or less prolonged stop in its left hand end position but will not dwell when it reaches its right hand end position. According to the description above, that depends upon the fact that the pressure fluid passing operation duct 21 by the reversing valve section 27d and 27c in one direction will be urged to pass through throttling valve C, but in the other direction is led past i. e. it by-passes the throttling valve. If it is desired to have the table to make a stop at both of its end positions it will be apparent that pass-by duct 73, 77 only is to be closed so that the pressure fluid in both directions is urged to pass through the throttling valve C. That could be done by a separate cut-off valve, but in the type shown in the drawings I have preferred to incorporate such a cut-off valve with the throttling valve C. In that valve the plug 68 has a notch 86, in the position of Fig. 1 and 2 connecting ducts 73 and 77. In the position of Fig. 3 this connection is cut-off, the pressure fluid is urged every time to pass through throttling valve C, and the table accordingly will make a stop at each of its end positions.

More particularly, in the position illustrated in Fig. 1, pressure fluid passes from duct 49 through ducts 47, 32, 24, 16, and 11 into chamber 10 of motor 5. When the table 1 has reached its left-hand position, it actuates the snap reverser, and the snap reverser brings the valve unit A into the position shown in Fig. 2. Piston 17 at first remains in its left-hand position according to Fig. 1. Pressure fluid then passes from duct 49 through ducts 39, 29 and 19 and presses the piston 17 to its right-hand position as shown in Fig. 2. The pressure fluid leaving valve B must pass through duct 21, openings 72 and 71, i. e. the throttle valve, and ducts 76, 36, 52 and 41. Therefore, it will take some little time before piston 17 has reached its right-hand position, and the table 1 will make a corresponding stop in its left-hand position. When the piston 17 has reached its right-hand position, pressure fluid passes from duct 49 through ducts 47, 26, 13, and 9 into chamber 8 of motor 5 and forces the piston 17 and the table 1 to the right. When the table has reached its right-hand position, it actuates the snap reverser D which actuates the valve A into the position according to Fig. 1. Pressure fluid now passes from duct 49 through ducts 48, 33, 77, 73, and 21 and forces piston 17 to its left-hand position. This takes place rapidly, because the pressure fluid does not pass the throttle valve, and, therefore, the table 1 does not make any stop in its right-hand position.

Desiring the table to make no stop in either of the end positions one only needs to set the throttling valve out of operation for instance by entirely opening channel 71. The flow of pressure fluid then will not be throttled and therefore it matters not whether valve C has the position of Figs. 1 and 2 or the position of Fig. 3.

Sometime it may happen that the table is desired to make a stop at the right hand end position, but not at the left hand end position. Such an arrangement may be accomplished by valves 88 and 89 in lines 78 and 51 respectively and illustrated schematically. In the working cycles hitherto described it has been assumed that the valve 88 was closed and valve 89 was open. If, instead of that, valve 89 is closed and valve 88 is opened, duct 77 over section 27d of the reversing valve will be connected with the venting duct 41 for returning fluid. In consequence of this the passing of the pressure fluid through operating duct 21 only will be throttled when the delaying piston 17 is to move in the left hand direction. Accordingly, table 1 only will make a stop at its right hand end position. If valve C is set in the position of Fig. 3 the pressure fluid in this case in both directions of course will pass through throttling valve C and the table accordingly will make a stop at each of its end positions.

In the embodiment according to the drawings the delay valve B has the shape of a piston 17 reciprocating in a cylinder. Through turned out recesses 81 and 82 on piston 17 the pressure chambers 8 and 10 alternately are connected with pressure duct 49 and return duct 41 in a way that pressure chamber 10 in the left hand limit position of piston 17, according to Fig. 1, is connected with pressure duct 49 and pressure chamber 8 is connected with return duct 41, while in the right hand limit position of piston 17 of Fig. 2 pressure chamber 8 is connected with pressure duct 49 and pressure chamber 10 is connected with return duct 41.

The movements of delay piston 17 are governed by sections 27a, 27d, and 27e of the reversing valve. These sections being in the position of Fig. 1 the piston 17 is urged to its left hand end position, and being in the position of Fig. 2 the piston is urged to its right hand end position.

Throttling valve C is interposed in the operating duct 21, 76 of the delay valve B. The throttling valve may be designed in various ways. According to the embodiment shown in the drawings it comprises a plug 70 rotatable in a central boring 69 in the valve plug 68. Through channels 71 and 72 boring 69 is connected with ducts 21 and 76. By turning plug 70 to obstruct more or less of the channel 71 a desired rate of throttling may be obtained.

Valve sections 27a–27e are assembled into a reversing valve A and are all governed by the snap reverser D. In assembling reversing valve A it will be important that all sections and especially the sections 27b and 27c are placed exactly right relative to the snap reverser. When the snap reverser and also the reversing valve are in their middle positions, the lips 59 and 62 accordingly opposing one another, and openings 42, 43, 44 and 46 being closed, the pin 54 has to be in the middle of notch 58. At both sides of pin 54 accordingly there shall be a clearance of ½ S. Only in that case the lip 59 at each turning-over will pass the lip 62 even so much that the spring device 61, 63 may functionate.

The dimension of clearance S accordingly will determine closing of the reversing valve at the snapping position, i. e. the greater the allowance S the greater the free area of passage through openings 42, 44 and 43, 46 respectively will be in the snapping position.

In order to facilitate the movement of valve plugs 28a–e and 68 with minimal friction and with optimal adaptation to the surrounding valve walls it will be important that the plugs are loaded symmetrically, so that the pressure fluid will not press them against the valve wall.

For that reason the plug 68 has a notch 84, by the channel 74 connected with a notch diametrically opposed, in its turn connected with channel 71. Because the two notches 83 and 86 also being diametrically opposed and always being connected one to another through channel 73 an unbalanced load also cannot occur here. Equally the channels 31, 34, and 37 in plugs 28a, 28d, and 28e indicated with dotted lines in certain positions function as pressure equalizing channels for attaining an equal load on the plugs.

What is claimed is:

1. The combination with a reciprocatable element such as a machine table and a double acting hydraulic motor connected to said element for reciprocating the same, a first pair of pressure and return ducts for conveying pressure fluid to and away from said motor and a first pair of reversing valve means for reversing the pressure and return ducts thereby to reverse the direction of said motor and hence also said elements; of a hydraulically actuated double acting delay valve connected in said pressure and return ducts for effecting a dwell in said element when the latter reaches an end position in its path of reciprocation, a second pair of pressure and return ducts for conveying pressure fluid to and away from said delay valve, a second pair of reversing valve means connected respectively in said second pair of ducts for reversing said second pair of ducts thereby to reverse the direction of said delay valve, an adjustable throttling valve connected in one of the ducts of said second pair, a by-pass duct shunted to said throttling valve and one of said second pair of reversing valve means, valve means connected in said by-pass duct, and means arranging last said valve means and said second pair of valve means for common operation for periodic reversal thereof in accordance with the reciprocating movement of said element.

2. The combination as defined in claim 1 and wherein said first pair of reversing valve means are arranged for operation simultaneously with said second pair of reversing valve means.

3. The combination as defined in claim 1 wherein all of said valve means are integrated into a common structural unit for operation simultaneously by a common operator.

4. The combination as defined in claim 3 wherein the common operator for said integrated valve means is constituted by a snap reversing mechanism actuated by said reciprocatable element when the latter reaches an end position.

5. The combination as defined in claim 1 and which further includes duct means connecting said by-pass duct to said first pair of pressure and return ducts, and cut-off valve means connected in said duct means.

References Cited in the file of this patent

UNITED STATES PATENTS

| 1,893,076 | Flygare | Jan. 3, 1933 |
| 2,268,389 | Garside | Dec. 30, 1941 |
| 2,361,849 | Johnson | Oct. 31, 1944 |
| 2,496,756 | Seborg | Feb. 7, 1950 |